United States Patent

[11] 3,620,449

| [72] | Inventors | Gerhard Hohn<br>28 Bremen; Probststrasse 1,<br>Josef Lingnau, Brandenweg 2, 28 Bremen-<br>Borgfeld, both of Germany |
|---|---|---|
| [21] | Appl. No. | 14,817 |
| [22] | Filed | Feb. 26, 1970 |
| [45] | Patented | Nov. 16, 1971 |

[54] THERMALLY CONTROLLED CONDENSATE TRAP
6 Claims, 1 Drawing Fig.

| [52] | U.S. Cl. | 236/56 |
|---|---|---|
| [51] | Int. Cl. | F16t 1/10 |
| [50] | Field of Search | 236/56, 58, 59, 34 |

[56] References Cited
UNITED STATES PATENTS

| 1,467,818 | 9/1923 | Smith | 236/56 |
|---|---|---|---|
| 3,302,878 | 2/1967 | Fujiwara | 236/56 |

FOREIGN PATENTS

| 482,058 | 3/1938 | Great Britain | 236/56 |
|---|---|---|---|

Primary Examiner—Edward J. Michael
Attorney—Richards and Geier

ABSTRACT: A thermally controlled condensate trap is shown. The trap includes a housing having cover means secured thereto and inlet and outlet openings therewithin. A sludge strainer is disposed within the housing and bears cutoff valve means which are controlled by temperature sensing means.

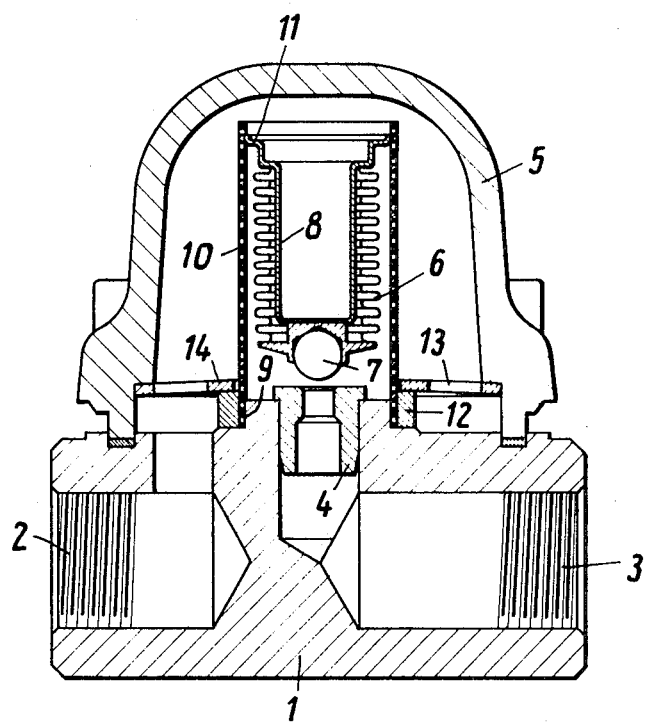

THERMALLY CONTROLLED CONDENSATE TRAP

DESCRIPTION OF THE INVENTION

This invention relates to a thermally controlled condensate trap. The trap includes a housing which is provided with a cover cap. Within the housing is a temperature sensor, preferably in the form of a bellows which is connected to a cutoff valve. The valve seat for the cutoff valve is disposed within the housing intermediate inlet and outlet means. A tube-shaped sludge strainer is also disposed within the housing and surrounds the temperature sensor, cutoff valve and valve seat. The sludge strainer is connected within the housing adjacent and surrounding the valve seat and preferably has a collar about the opposite end thereof.

By the structure of this invention we have constructed a condensate trap wherein parts may be simply and easily replaced, the spacing between the valve and valve seat can be simply and easily adjusted, and any leakage can be easily seen and corrected.

In the preferred modification of this invention the temperature sensor is attached to the sludge strainer at one end adjacent the collar.

In the most advantageous embodiment of this invention the temperature sensor is connected to the internal wall of the sludge strainer preferably by a collar which is attached to the sensor. The attachment of the parts is fixed but also, initially is preferably axially movable so that the spacing of the parts can be controlled. Also, in the preferred design, the sludge strainer is pressed against the portion of the housing against which its lower end abuts by means of a spring. An annular collar surrounds the sludge strainer at this point and a plate spring abuts the collar. Also, preferably, openings are provided within the spring for passage of the medium.

In the preferred form of this invention, also, the sludge strainer is conical in form and corresponding conical adjacent surfaces are provided for its attachment.

The invention will now be further described by reference to the accompanying drawings which are made a part of this specification.

The single FIG. is a longitudinal sectional view of the condensate machine made in accordance with this invention.

Now referring to the specific form of this invention as set forth in the drawings herein a housing 1 is provided which is provided with an entry port 2 and an outlet port 3. The seat for the cutoff valve 4 is located within housing 1 intermediate between ports 2 and 3. A cover cap 5 is secured to housing 1 and provides a passage for the flow of the medium. A temperature sensor 6 is in the form of a bellows and is connected to cutoff valve means 7. The temperature sensor is operated, for example, by evaportable fluid.

Closure means 8 are provided adjacent to the temperature sensor and permit control of the valve 7. The closure means 8 also have a collar 11 attached thereto at one end which collar 11 is also attached to the sludge strainer 10 at one end thereof. The opposite end 9 of the sludge strainer is attached to an abutment carried by housing 1 which contains a conical portion which abuts the corresponding conical portion of the sludge strainer.

An annular collar 12 is provided adjacent the end 9 of the sludge strainer 10 and a plate spring 14 abuts the collar. Spring 14 is provided with openings 13 therewithin to provide for passage of the medium therethrough. Spring 14 is carried by cap 5 as shown. Thus parts 6, 7, 8, 10 and 11 of the entire unit are held together by spring tension.

If removal of the unit is required this can be easily done by snapping off cap 5 which will permit simple removal of parts without further work.

Since tolerances of parts vary it is necessary, in the operation of the device, to space the valve 7 from the seat 4 in proper relationship. This is easily done by first determining the distance required by calculation or by a standardized gauge and then moving the parts on one another to the distance required. The parts can then be held in position by appropriate positioning screws or by welding.

The foregoing sets forth the manner in which the objects of this invention are achieved.

We claim:

1. A thermally controlled condensate trap, comprising a housing having a lower housing section with an entry port, an outlet port and a valve seat intermediate said ports, and a cover cap mounted upon said lower housing section, a temperature sensor located within said housing and consisting of a bellows filled with an evaporatable fluid, closure means connected with said temperature sensor, a sludge strainer enclosing said temperature sensor, said closure means and said valve seat, said temperature sensor being attached to that end of said sludge strainer which is away from said valve seat, said lower housing section having a recess concentrically enclosing said valve seat, said sludge strainer having an opposite end adjacent to said valve seat and mounted in said recess, an annular collar enclosing said opposite end of the sludge strainer, and a plate spring mounted upon said collar, said cover cap having an inner supporting surface engaging the outer edge of said plate spring.

2. A condensate trap according to claim 1, wherein said temperature sensor is axially adjustably connected to said sludge strainer to adjust the distance between said closure means and said valve seat.

3. A condensate trap according to claim 2, wherein said temperature sensor has a collar attached to the inner wall of the sludge strainer.

4. A condensate trap according to claim 3, wherein said plate spring has openings for the passage of the flowing medium.

5. A condensate trap according to claim 4, wherein said annular collar consists of a clamping ring.

6. A condensate trap according to claim 5, wherein said recess of the lower housing portion and said opposite end of the sludge strainer have corresponding conical supporting surfaces.

* * * * *